(12) United States Patent
Xu et al.

(10) Patent No.: US 11,428,077 B2
(45) Date of Patent: Aug. 30, 2022

(54) GEOLOGICAL INTERPRETATION WITH ARTIFICIAL INTELLIGENCE

(71) Applicant: Schlumberger Technology Corporation, Sugar Land, TX (US)

(72) Inventors: Yan Kai Xu, Missouri City, TX (US); Qingfeng Zhu, Beijing (CN); Hui Xie, Katy, TX (US); Helen Xiaoyan Zhong, Sugar Land, TX (US); Ettore Mirto, Sugar Land, TX (US); Aria Abubakar, Sugar Land, TX (US); Yao Feng, Sugar Land, TX (US); Ping Zhang, Beijing (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 274 days.

(21) Appl. No.: 16/503,753

(22) Filed: Jul. 5, 2019

(65) Prior Publication Data

US 2020/0011158 A1 Jan. 9, 2020

Related U.S. Application Data

(60) Provisional application No. 62/694,176, filed on Jul. 5, 2018.

(51) Int. Cl.
*E21B 41/00* (2006.01)
*E21B 44/00* (2006.01)
(Continued)

(52) U.S. Cl.
CPC .......... *E21B 41/0092* (2013.01); *E21B 44/00* (2013.01); *E21B 49/00* (2013.01);
(Continued)

(58) Field of Classification Search
CPC ...... E21B 41/0092; E21B 44/00; E21B 49/00; E21B 7/04; E21B 2200/22; G06F 30/20;
(Continued)

(56) References Cited

U.S. PATENT DOCUMENTS

| 6,594,584 B1 | 7/2003 | Omeragic et al. |
| 2014/0351183 A1 | 11/2014 | Germain et al. |

(Continued)

FOREIGN PATENT DOCUMENTS

WO 2018067131 A1 4/2018

OTHER PUBLICATIONS

International Search Report and Written Opinion issued in International Patent application PCT/US2019/040672 dated Oct. 25, 2019, 11 pages.

(Continued)

*Primary Examiner* — Bijan Mapar
(74) *Attorney, Agent, or Firm* — Jeffrey D. Frantz

(57) ABSTRACT

A method for drilling includes obtaining formation-measurement pairings, training a machine-learning model using the formation-measurement pairings, receiving measurements obtained by a tool positioned in a well formed in a formation, and generating a formation model of at least a portion of the formation using the machine-learning model and the measurements. The formation model represents one or more physical parameters of the formation, one or more structural parameters of the formation, or both.

19 Claims, 8 Drawing Sheets

(51) Int. Cl.
    *G06N 20/00*     (2019.01)
    *G06F 30/20*     (2020.01)
    *E21B 49/00*     (2006.01)
    *E21B 7/04*     (2006.01)
    *G06F 111/02*     (2020.01)

(52) U.S. Cl.
    CPC ............ *G06F 30/20* (2020.01); *G06N 20/00* (2019.01); *E21B 7/04* (2013.01); *G06F 2111/02* (2020.01)

(58) Field of Classification Search
    CPC .... G06F 2111/02; G06N 20/00; G06N 20/10; G06N 3/0454; G06N 20/20; G06N 5/003
    See application file for complete search history.

(56) References Cited

U.S. PATENT DOCUMENTS

| | | | |
|---|---|---|---|
| 2014/0365409 A1* | 12/2014 | Burch | ............... G06N 20/00 706/12 |
| 2015/0218914 A1* | 8/2015 | Marx | ............... E21B 41/0092 175/24 |
| 2018/0025269 A1 | 1/2018 | Dursun et al. | |

OTHER PUBLICATIONS

International Preliminary Report on Patentability of International Patent Application No. PCT/US2019/040672 dated Jan. 5, 2021, 8 pages.

\* cited by examiner

GEOLOGICAL INTERPRETATION WITH ARTIFICIAL INTELLIGENCE

CROSS-REFERENCE TO RELATED APPLICATIONS

This application claims priority to U.S. Provisional Patent Application Ser. No. 62/694,176, which was filed on Jul. 5, 2018 and is incorporated by reference herein in its entirety.

BACKGROUND

Sub-surface geological interpretation is a process in the oil and gas exploration and production industry. By measuring formation structure and properties with downhole tools (wireline tools, logging-while-drilling (LWD) tools or sensors), a user can interpret the geological characteristics of the subterranean environment. Knowledge of such characteristics can enable the user to take action to enhance the exploration and production results.

A downhole formation model can contain various characteristics that can be measured and/or inferred from measurements, such as, for example: (a) structural characteristics, e.g., bed thickness, bed dip, fault, etc.; and (b) property characteristics, e.g., resistivity, density, porosity, permeability, etc. Interpreting measurements using the model can generally be a process of finding the model structure and properties that result in a minimal mismatch between expected sensor response and the actual sensor measurements.

However, for the current modeling methods to be used in taking action that affects an on-going drilling process, the models used are generally simplistic, one-dimensional models. In such models, the boundaries between the rock layers are generally considered to be parallel or with a uniform dip angle. This may diminish the accuracy of the models, leading to the potential for encountering boundaries in unexpected locations.

Furthermore, data transmission rates from the downhole tools to the processors at the surface with the capability of performing automated (or assisting in semi-automated) interpretation are generally relatively low. For example, mud-pulse telemetry is often used, but the transmission rates are on the order of a few bits per second. Accordingly, at least some of the sensor data may not be transmitted, and may be collected after the sensors are removed from the wellbore. This data may then be used for offset well analysis when subsequently planning and drilling other wells, but may arrive too late to be used in real-time in drilling a current well.

SUMMARY

Embodiments of the disclosure may provide a method for drilling. The method includes obtaining formation-measurement pairings, training a machine-learning model using the formation-measurement pairings, receiving measurements obtained by a tool positioned in a well formed in a formation, and generating a formation model of at least a portion of the formation using the machine-learning model and the measurements. The formation model represents one or more physical parameters of the formation, one or more structural parameters of the formation, or both.

In at least one embodiment, the method also includes defining the formation in the formation model using one or more one-dimensional models.

In at least one embodiment, the method also includes defining the formation in the formation model using one or more pixel-based models.

In at least one embodiment, the method also includes pre-processing the measurements obtained by the tool by scaling the measurements, normalizing the measurements, or both.

In at least one embodiment, obtaining the formation-measurement pairings includes receiving data collected while drilling offset wells.

In at least one embodiment, the obtaining the formation-measurement pairings includes defining a well path through a second formation, and simulating drilling through the second formation along the well path. Simulating includes generating measurements while simulating the drilling. In such an embodiment, obtaining the formation-measurement pairings also includes determining one of the formation-measurement pairings based on the second formation and one or more of the measurements generated while simulating the drilling.

In at least one embodiment, simulating drilling includes changing one or more parameters of the second formation, the well path, or the tool, or changing a depth of the tool in the well path, or using a different well path, and obtaining the formation-measurement pairings includes determining another one of the formation-measurement pairings after changing the one or more parameters, or changing the depth, or using the different well path.

In at least one embodiment, generating the formation model includes generating the formation model using a processor positioned in the well, and training the machine-learning model includes training the machine-learning model using computing resources that are not in the well.

In at least one embodiment, generating the formation model includes using measurements collected in recorded mode measurement while drilling, and the measurements collected in recorded mode measurement are not transmitted from the tool, while the tool is in the well, to a top surface of the well.

In at least one embodiment, the method includes adjusting a trajectory of the well based in part on the formation model, without intervention from a top surface of the well.

In at least one embodiment, the machine-learning model includes a regression model configured to generate an output within a continuous range.

In at least one embodiment, the formation model represents a portion of the formation that is proximal to and at least partially ahead of the tool on a well path.

Embodiments of the disclosure may also include a drilling tool including a sensor positioned in a well and configured to acquire measurements representing a formation, a processor positioned in the well and in communication with the sensor, and a memory system in communication with the sensor and the processor and positioned in the well. The memory system includes one or more non-transitory, computer-readable media storing thereon a database for the acquired measurements, a trained machine-learning algorithm, and instructions that, when executed, cause the drilling tool to perform operations. The operations include receiving the measurements acquired by the sensor, and generating a formation model of at least a portion of the formation using the machine-learning model and the measurements.

In at least one embodiment, the operations further include receiving the trained machine-learning model from a processor that is remote from the drilling tool. For example, the processor in the well is not used to train the trained machine-learning model.

In at least one embodiment, the operations further include storing at least some of the acquired measurements. Generating the formation model includes using the measurements that are stored in the memory system, and at least some of the measurements that are stored in the memory system are not transmitted to a top surface of the well.

In at least one embodiment, the operations further include adjusting a trajectory of the well based in part on the formation model, without intervention from a top surface.

In at least one embodiment, the trained machine-learning model includes a regression model configured to generate an output within a continuous range.

In at least one embodiment, the formation model represents a portion of the formation that is proximal to and at least partially ahead of the drilling tool on a well path.

Embodiments of the disclosure may also provide a method for drilling. The method includes receiving a trained machine-learning model in a drilling tool. The machine learning model is trained using a training dataset including formation-measurement pairings, and the machine-learning model is configured to perform a non-linear, regression task and output a one-dimensional model of a formation based on measurements acquired in the well through the formation or a pixelized model of the formation based on the measurements. The method also includes obtaining subject measurements using the drilling tool positioned in a subject well formed in a subject formation, and generating a formation model of at least a portion of the subject formation using the trained machine-learning model and the subject measurements.

In at least one embodiment, at least some of the subject measurements acquired by the tool in the well are not transmitted to a top surface of the subject well, and the method further includes adjusting a trajectory of the subject well based on the generated formation model without intervention from the top surface.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD").

As an example, a well design system can account for one or more capabilities of a drilling system or drilling systems that may be utilized at a wellsite. As an example, a drilling engineer may be called upon to take such capabilities into account, for example, as one or more of various designs and specifications are created.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

Figure 1:
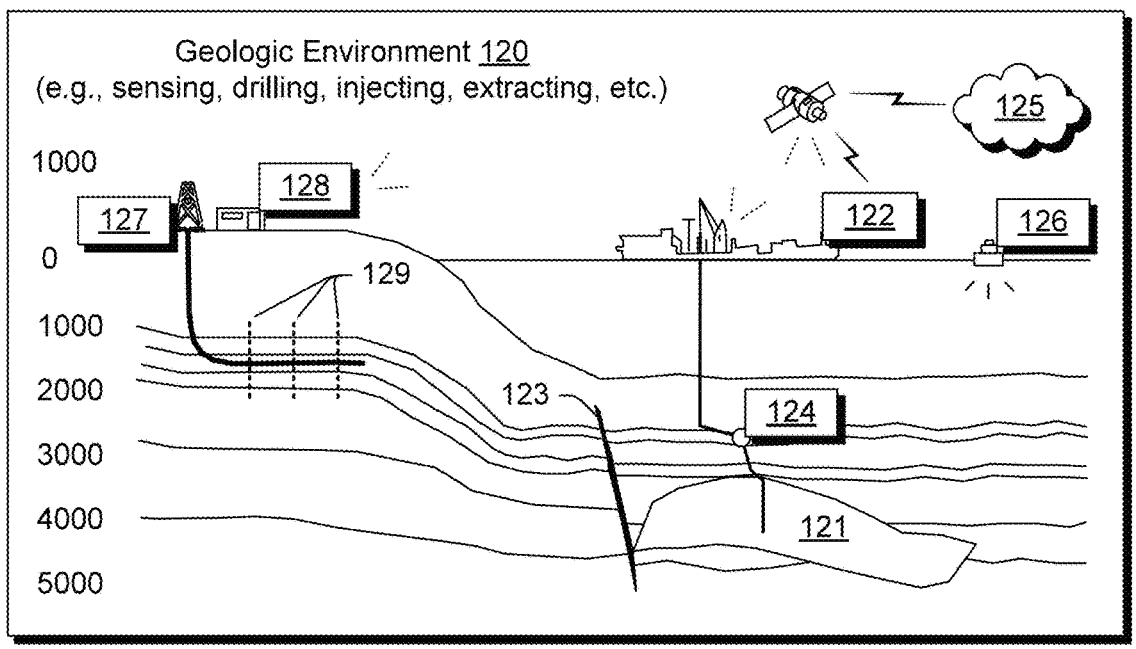
FIG. 1 illustrates examples of equipment in a geologic environment, according to an embodiment.
Figure 1:
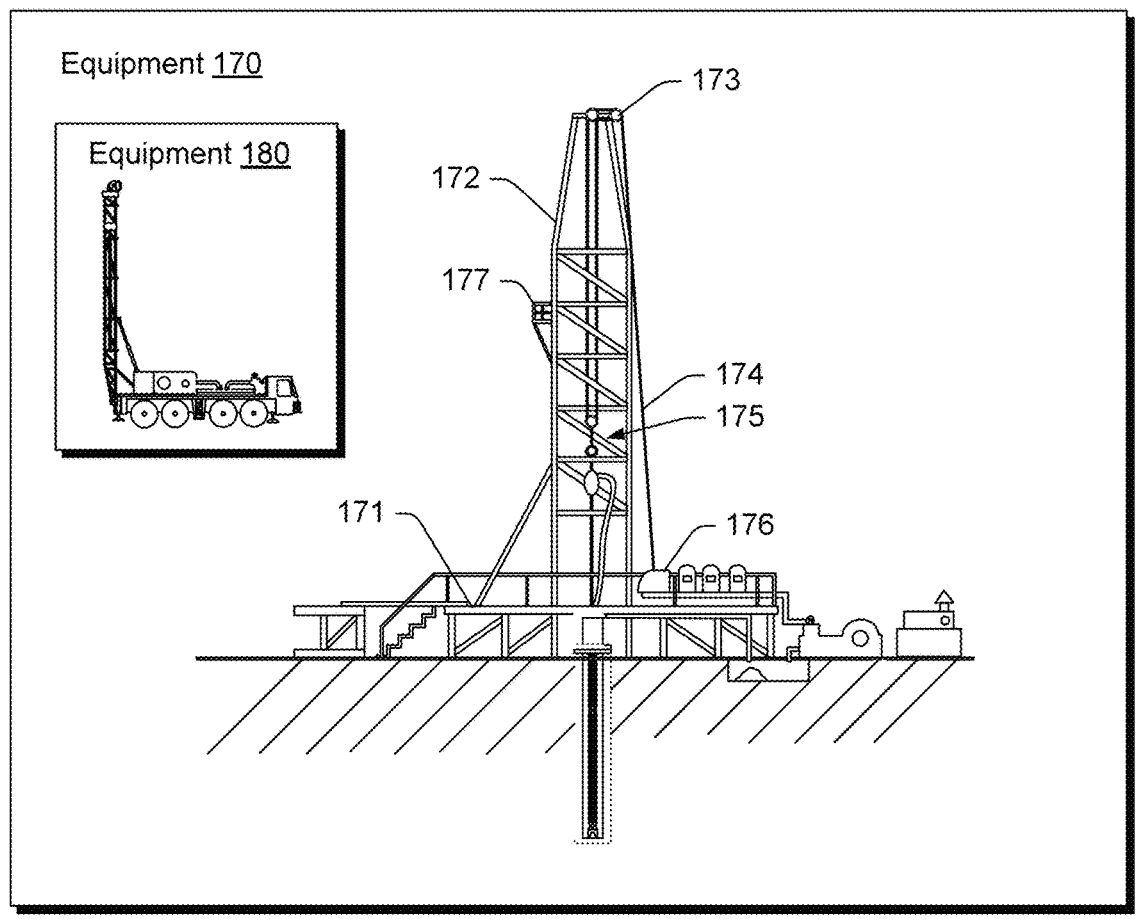

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
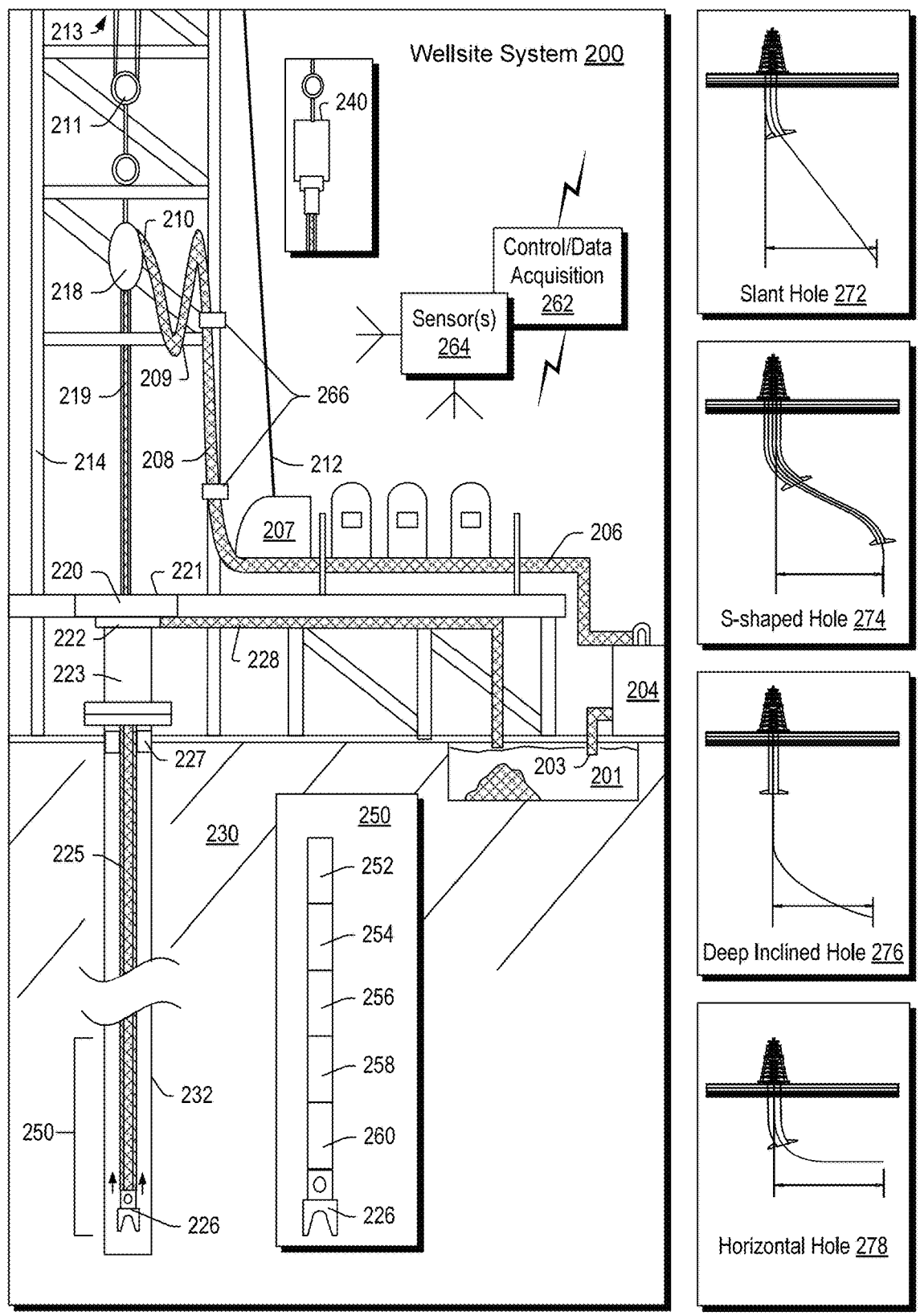
FIG. 2 illustrates an example of a system and examples of types of holes, according to an embodiment.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventers (BOPS) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drill-string assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
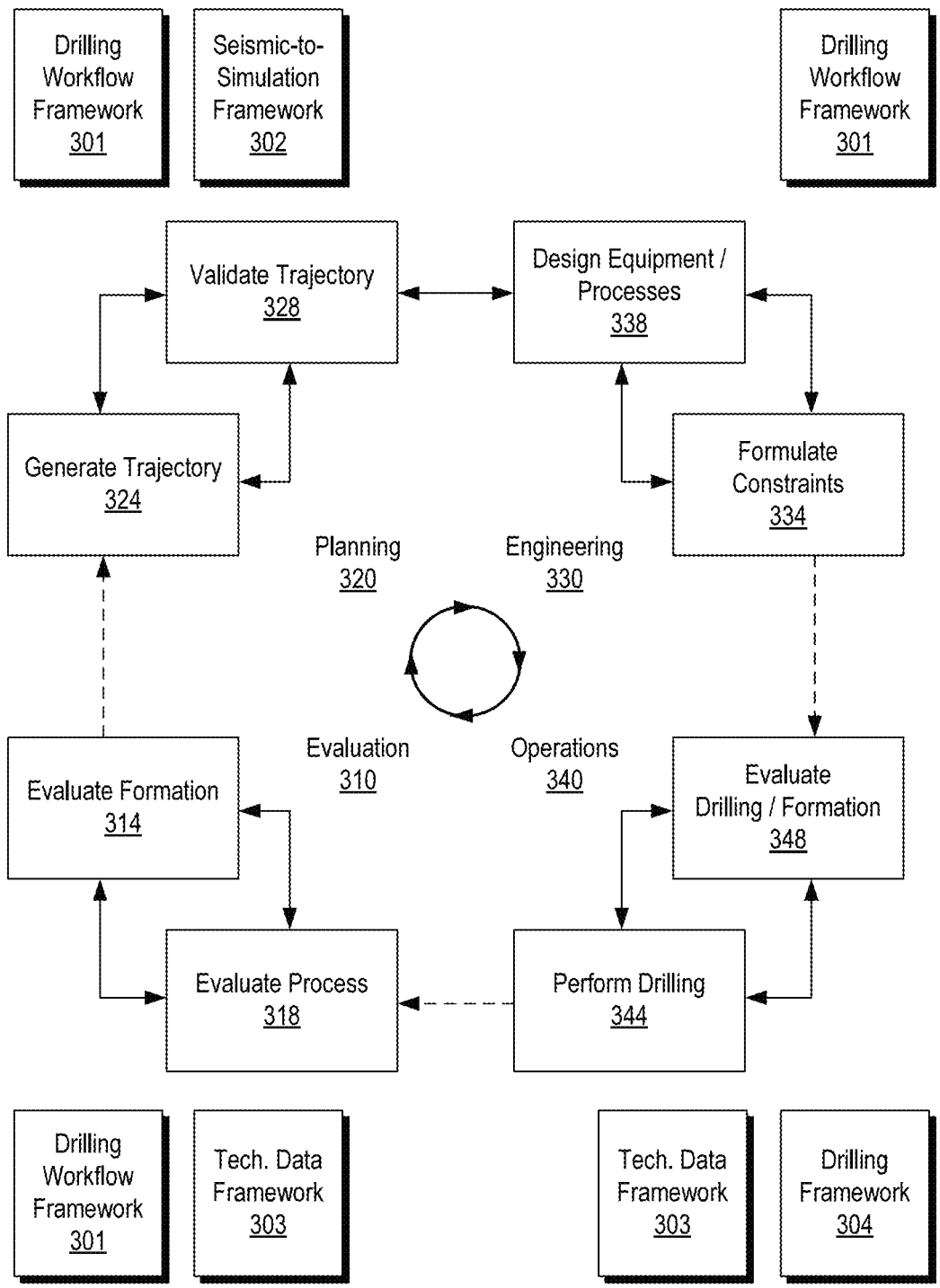
FIG. 3 illustrates an example of a drilling system, according to an embodiment.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Interpretation Workflow

Figure 4:
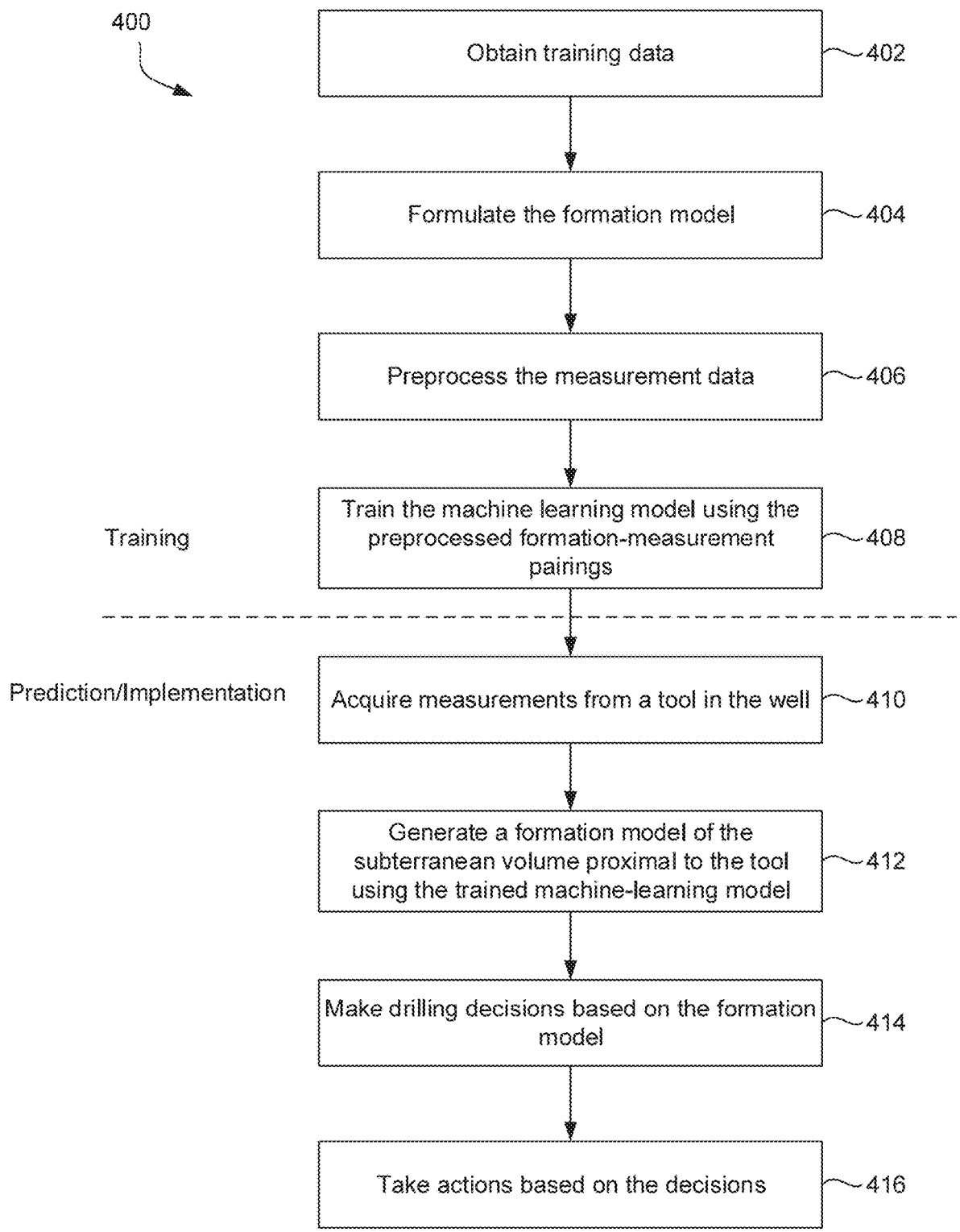
FIG. 4 illustrates a flowchart of a method for drilling, according to an embodiment.

FIG. 4 illustrates a flowchart of a method 400 for drilling, according to an embodiment. The method 400 may generally employ a "artificial intelligence" or AI (e.g., machine-learning model) to at least partially automate the interpretation task. As will be explained in greater detail below, the method 400 may be split into a training phase and a prediction/implementation phase. The training phase can be run on high-performance computing resources "offline" (i.e., not during drilling operations or otherwise prior to interpretation processes), and potentially for long durations (e.g., days, weeks, etc.). The machine-learning model can be configured, via such training, to predict a formation model when measurements are acquired from drilling or production operations.

The prediction phase may be a relatively fast, by comparison, analytical evaluation of the collected data, using the trained machine-learning model. Therefore, the interpreted formation model can be obtained potentially in seconds, which may facilitate real-time operation. Furthermore, in an example embodiment, the interpretation problem can be formulated as a regression problem (e.g., returning results within a continuous range, rather than classifying data in discrete categories), which may further assist in accurately modeling the subterranean volume or properties (e.g., formation).

Obtain Training Data

The method 400 may begin by obtaining training data, as at 402. The training data may be formation-measurement pairings. That is, the training data may be sets of measurements that are matched to the formation characteristics that they represent, e.g., in which they are taken. Such measurements may include resistivity, in the case of electromagnetic logging; however, other types of measurements may be used, including nuclear magnetic resonance (NMR) measurements, etc. The formation characteristics may include any type of structural or physical characteristics, including dip angle, density, porosity, permeability, etc.

The training data may be obtained from offset wells or well logs acquired from other locations. In another embodiment, the training data may be obtained synthetically, by modeling measurements that are expected in a given downhole environment by a tool on a certain well path. For example, the process for obtaining the training data at 402 may proceed as shown in FIG. 5.

Figure 5:
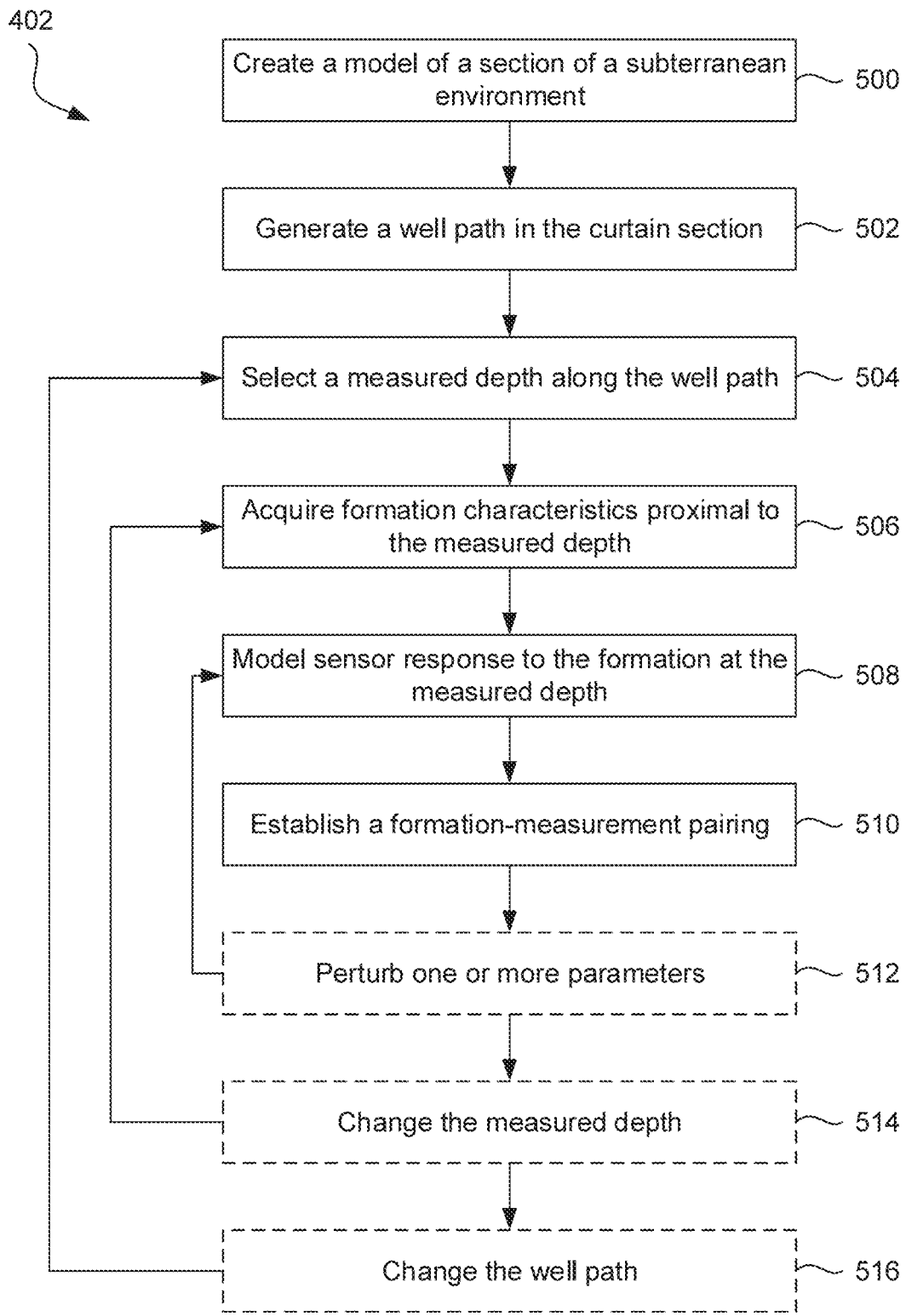
FIG. 5 illustrates a flowchart of a process for obtaining training data, according to an embodiment.
Figure 6:
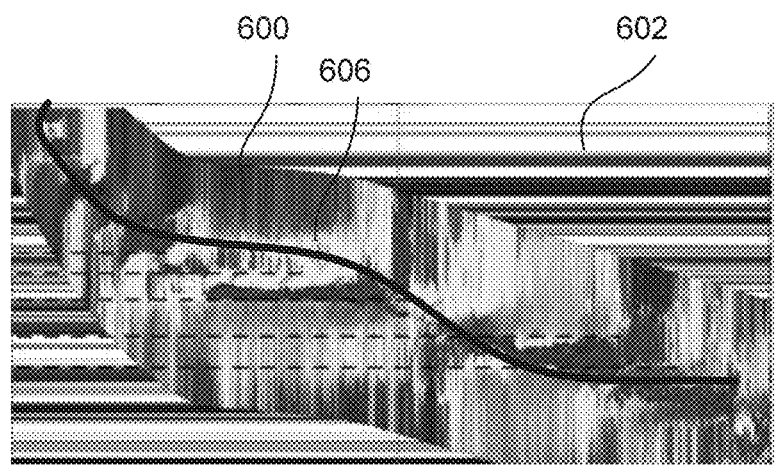
FIG. 6 illustrates an example of a curtain section in a formation model, according to an embodiment.

Referring to FIG. 5 in greater detail, the process 402 may include creating a model of a section of a subterranean environment, as at 500. Such a model may generally be plotted on a "curtain section" 602 and may depict the formation characteristics along a strip of the downhole environment in which a well path may extend. FIG. 6 illustrates an example of an existing interpreted formation model 600 plotted on a curtain section 602. As can be seen, the formation model 600 in the curtain section 602 may include a more detailed inversion of formation parameters, while the area on the curtain section 602 away from the formation model 600 may be a relatively simple, one-dimensional model in which the parameters are considered to vary along horizontal boundaries. The structure and properties of the formation in the curtain section 600 may be known to a high degree of certainty, e.g., based on well logs from wells previously drilled, or on seismic data, etc. from the area. In other embodiments, the curtain section 600 and/or the surrounding formation model may be more complex, representing two or more parameters in two or three dimensions.

The process 402 may then include generating a well path in the curtain section, as at 502. As shown in FIG. 6, a well path 606 may have a particular trajectory that leads the well path 606 through the curtain section 600, but may be one of many possibilities within the curtain section.

The process 402 may proceed to selecting a depth (e.g., a "measured depth") for a tool along the well path, as at 504. The depth may be any selected depth at which sensor measurements may be useful.

The process 402 may include acquiring formation characteristics proximal to the measured depth, as at 506. As noted above, these formation characteristics may be in the curtain section 400, where the formation characteristics may be a priori known to a relatively high degree of certainty based on prior data acquisition activities (e.g., as part of drilling prior wells).

The process 402 may then proceed to modeling (e.g., "forward modeling") the sensor operation to acquire sensor data that matches the formation characteristics, as at 508. With both the formation characteristics and the sensor data thus known, the process 402 may establish a formation-measurement pairing, as at 510, which may be stored for later use in training a machine-learning model.

To train a machine-learning model effectively, a large number of such formation-measurement pairings may be employed. Accordingly, the process 402 may be iterative in one or more of several ways to establish additional formation-measurement pairings. For example, the process 402 may change or "perturb" one or more of the parameters (e.g., formation structure, boundary geometry or location, tool orientation, etc.), as at 512. The process 402 may then loop back to forward modeling the sensor response to the formation at 508, this time with different parameters, to establish another formation-measurement pairing at 508. Further, the process 402 may include changing the measured depth of the tool, as at 514, and then again acquiring formation characteristics at the new measured depth at 506, and forward modeling at 508. In addition, the process 402 may include changing the well path in the curtain section, as at 516, and proceeding back to acquiring formation characteristics at 506 and forward modeling the sensor response at 508.

These process of acquiring different formation-measurement pairs may be nested, as depicted in FIG. 5. For example, one change in well path at 516 may provide for formation-measurement pairings to be established at multiple different depths at 514. Further, one change in depth may provide for formation-measurement pairings to be established with multiple different parameter perturbations at 512. Thus, the training data may be acquired both from known formation-measurement pairings (e.g., from well logs) as well as modeled or synthetic data from modeled responses to hypothetical well drilling operations in known formations.

Define the Formation Model

Referring again to FIG. 4, the method 400 may proceed to mathematically defining or "formulating" the formation model that will be the output from the machine-learning model, as at 404. A formation definition can include geometry structure and layer properties, for example. The formation may thus be represented as a vector of parameters. There may be at least two types of formulations: model-based formula and pixel-based formula.

In a model-based formulation, a one, two, or three dimensional model may be employed. For example, in such models, the bed boundaries may be represented simply as parallel, planar surfaces, with the parameters for the formation being constant between the boundaries. As such, the parameters of the one-dimensional, model-based formulation may include positions of the boundaries, thicknesses of the layers, and global dip of the boundaries. Each formation layer can be assigned with different property values, e.g., density, resistivity, porosity, etc.

Figure 7:
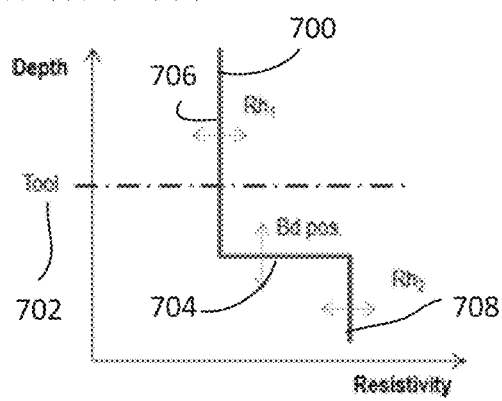
FIG. 7 illustrates an example of a model-based formulation of a formation, according to an embodiment.

FIG. 7 illustrates an example of such a one-dimensional, model-based approach. As shown, the model may plot resistivity 700 (the parameter) as measured by a tool 702 and depth. Further, a boundary is evidenced by the parameter value change at 704 between two constant intervals 706, 708.

The one-dimensional formation model (vectors) can be made more accurate, for example, by defining the dip as a parameter for each individual boundary. Thus, the boundaries might not be defined as strictly horizontal and parallel, but may extend at angles relative to one another, e.g., at different dips. Further, individual layers may have different anisotropy dips. Thus, the individual layer anisotropy dip may then be added into the parameter vector.

According to an example embodiment, a pixel-based formula can discretize the formation across the boundary, rather than constraining the intervals to a single parameter value. For example, depth intervals may be identified as "pixels," and may be defined irrespective of boundary locations. Each pixel may represent a static position and may be assigned formation property values at this position. Further, in some embodiments, the pixel size and location may be fixed.

Figure 8:
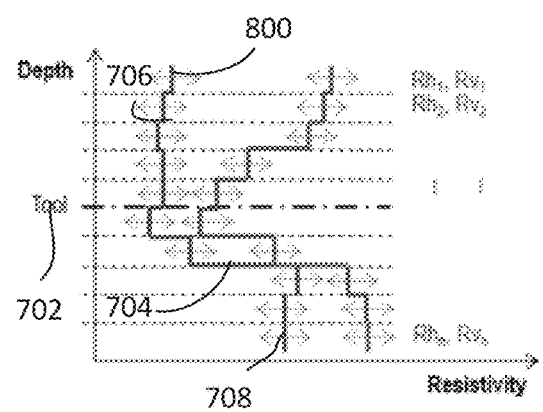
FIG. 8 illustrates an example of a pixel-based formulation of a formation, according to an embodiment.

FIG. 8 illustrates an example of a pixel-based formulation. As shown, the resistivity 800, analogous to the resistivity mapped in FIG. 7, may be discretized across the boundary 704. As shown, the resistivity 800 may be similar to the resistivity 700 plotted in FIG. 7, but may evidence a higher resolution, as the intervals 706, 708 are not constrained to a static parameter value, but rather are made up of pixels each with a potentially different parameter value.

Likewise, the boundary is not dimensionless in the depth space, but may have two or more parameter values.

Pixel-based methods may have a higher resolution and thus may be more accurate than model-based methods, but may include a larger amount of data, e.g., parameter values at each pixel, rather than at each layer/interval. Model-based formulations, on the other hand, may have fewer parameters to define, and thus the output space can be smaller.

Preprocess the Training Data

Referring back to FIG. 4, the method 400 may proceed to pre-processing the data, e.g., the formation-measurement pairings, as at 406. Specifically, the measurement data may be adjusted to accurately compare the measurements and provide more useful results. For example, pre-processing the measurement data may normalize or standardize the data. In a specific example, the data may be resistivity and may be formatted to a logarithmic scale. Resistivity measurements may have a wide varying range in terms of ohm-meters, with variations at small numbers being as significant qualitatively as larger variations at larger numbers (e.g., the difference between 0.2 and 0.4 ohm-meters may be as relevant as the difference between 200 and 400 ohm-m).

Train the Machine-Learning Model

The method 400 may then proceed to training the machine-learning model using the training data, as at 408. Any suitable type of machine-learning model may be used, especially those configured to be employed for non-linear regression tasks. Examples of such machine-learning models include neural networks, gradient boost regression trees, Gaussian process regressions, and deep learning models.

In a specific example, machine-learning models for neural networks, gradient boost regression tree, Gaussian process regression, and deep learning were applied to a three-layer model interpretation problem with an example model-based formula. Among these different types of machine-learning models, the Gaussian process regression arrived at the most accurate result. On a randomized testing dataset, the error between interpreted parameter and true parameter forms a normal distribution with zero mean. The Gaussian process regression obtained the least standard deviation of error distribution among the different models tested. Below is the standard deviation of the errors on the interpreted global dip. Both gradient boost regression trees and Gaussian process regressions evidence an enhanced operation of the automatic interpretation in comparison to a Geological Positioning Service (GPS) interpretation, which was used as a benchmark.

TABLE 1

Performance of different machine-learning models versus GPS interpretation

| Model Type | Standard Deviation of error from true dip |
| --- | --- |
| GPS interpretation | 1.36 |
| Neural Network | 1.5 |
| Gradient Boost Regression Tree | 1.07 |
| Gaussian Process Regression | 0.71 |

A Deep Learning (DL) machine-learning model may be implemented in a pixel-based formulation. Such DL models can be very powerful and successful in digital image processing, which is generally analogous to the pixel-based formulation. A small piece of curtain section around the borehole may be represented as a pixels, where each pixel is assigned one or more property values. A deconvolutional network can be adopted in the DL model, whose input is measurements and output is a pixelized formation. The deep network includes un-pooling layer and a ReLu activation function. After the network is trained, the interpretation may run along a high-angle well. By combining the output pixelized formations at many different measured depths together, an interpretation canvas may be obtained. The example DL model based interpretation also shows better result than the existing automated interpretation processes.

Figure 9:
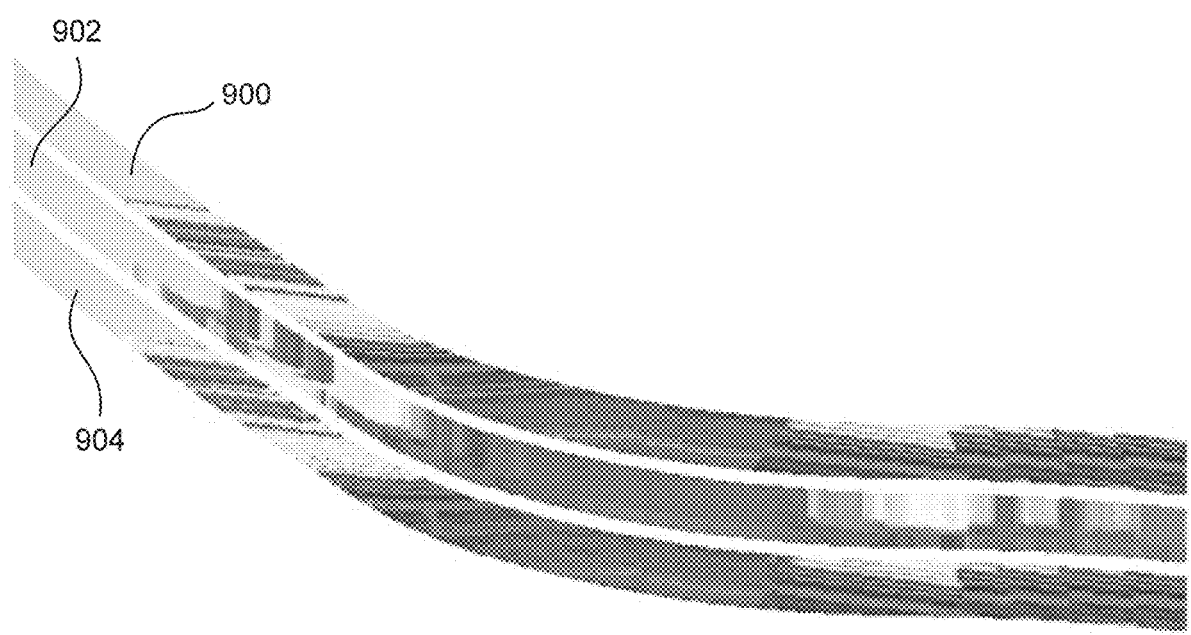
FIG. 9 illustrates an example of an actual formation section and two formation models, one of which represents an embodiment of the present disclosure.

FIG. 9 illustrates an example of three formation models aligned, side-by-side, evidencing an example of the enhancement to computing operations provided by the present disclosure. The top formation model 900 represents the actual formation, established with a high degree of certainty by a variety of testing and logging procedures. The next formation model 902 represents existing interpretation predictions, illustrating errors in deviations from the top formation model 900. Finally, the third formation model 904 represents a DL machine-learning model implemented as part of an example of the present disclosure. As can be appreciated qualitatively, the third formation model 904 is a closer approximation to the top, actual formation model 900 than the existing interpretation 902.

Predict the Downhole Formation Using the Machine-Learning Model

The method 400 may then proceed out of the training stage and into the prediction/implementation stage, as indicated by the horizontal line in FIG. 4. For example, the method 400 may proceed to acquiring measurements taken in a "subject" well (the well being drilled, for example) using a tool positioned in the subject well, as at 410. The tool may be, for example, part of the drillstring assembly 250 (FIG. 2), e.g., the MWD tool 254, and may be located proximal to a drill bit (e.g., the drill bit 226 of FIG. 2). The tool may include one or more sensors, e.g., resistivity sensors, NMR sensors, or others configured to take measurements representing characteristics of the surrounding formation. From these measurements, the method 400 may include generating a formation model of the subterranean volume (e.g., the formation) proximal to the tool using the trained machine-learning model, as at 412. This may also be referred to as "predicting" the characteristics of the formation. Moreover, as explained above, the formation model may be model-based or pixelized.

In some embodiments, electromagnetic logging measurements may provide insight into the formation characteristics up to 200 meters, or more, away from the tool, with at least some of these measurements providing insight into the formation ahead of the tool (e.g., where the tool is proceeding towards). Thus, the term "proximal" in this context refers to the area for which the measurements taken in the borehole provide information.

The prediction process can be a simple analytical computation, and thus may be completed rapidly, using relatively little computing resources, irrespective of the type of formation model implemented. For example, the tool in the wellbore may be provided with sufficient on-board processing resources to complete the predictions, but may, in some embodiments, not be used to train the model. In at least some embodiments, training the machine-learning model may rely on higher-power processing resources available at the top surface or otherwise remote from the tool in the wellbore. Thus, the tool may receive the trained machine learning model from the such higher-power processing resources.

Formation models with higher complexity generally result in longer training times, but when making the predictions at 412, the training may already be completed. Thus, using the method 400 in which the training phase is separate from the interpretation phase, real-time interpretation (e.g., interpretation in which results are acquired fast enough to be of use in an on-going drilling process) may be provided even when the time-consuming forward modeling techniques (e.g. to establish synthetic formation-measurement pairings) are employed.

For example, as at 414, decisions about drilling and/or production may be made, e.g., trajectory, drilling parameter, or other adjustments, based on the interpretation. These decisions may be made in real-time so that on-going drilling and/or production operations, from which the measurements were acquired, may be enhanced, and drilling cost can be minimized, by taking drilling actions at 416. Such actions may include adjusting a well path trajectory, tool orientation, drilling parameters, or the like.

Automatically-Adjusting Well Trajectory Downhole

In some embodiments, the interpretation may take place at the surface, using computing resources available and at least some of the measurements acquired from tools in the well. However, as mentioned above, at least some of the sensor measurements may not be immediately available at the surface, but may be stored in a memory system of the tool until the tool is extracted from the well at some later time. In an embodiment of the present disclosure, however, these recoded-mode measurements may be employed by an autonomous steering system in the well.

For example, the drilling device may be automatically controlled, and may be provided with an initial well plan, e.g., including a surface location, a target (e.g., a reservoir), and a path therebetween. As the drilling proceeds, sensor data is acquired by the tool. The tool may include a processor and a memory system that stores the trained machine-learning model, as discussed above, and may implement at least a portion of the method 400.

In such an embodiment, the method 400 may thus be extended to automatically adjusting the well path based in part on the formation model. Further, the formation model may be based on measurements taken in the well that are not available to the top surface (e.g., humans and/or equipment positioned outside of the well, whether or not physically proximal to the top of the well), and thus the well path adjustments may take place without intervention from the surface.

Computing Environment

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 10:
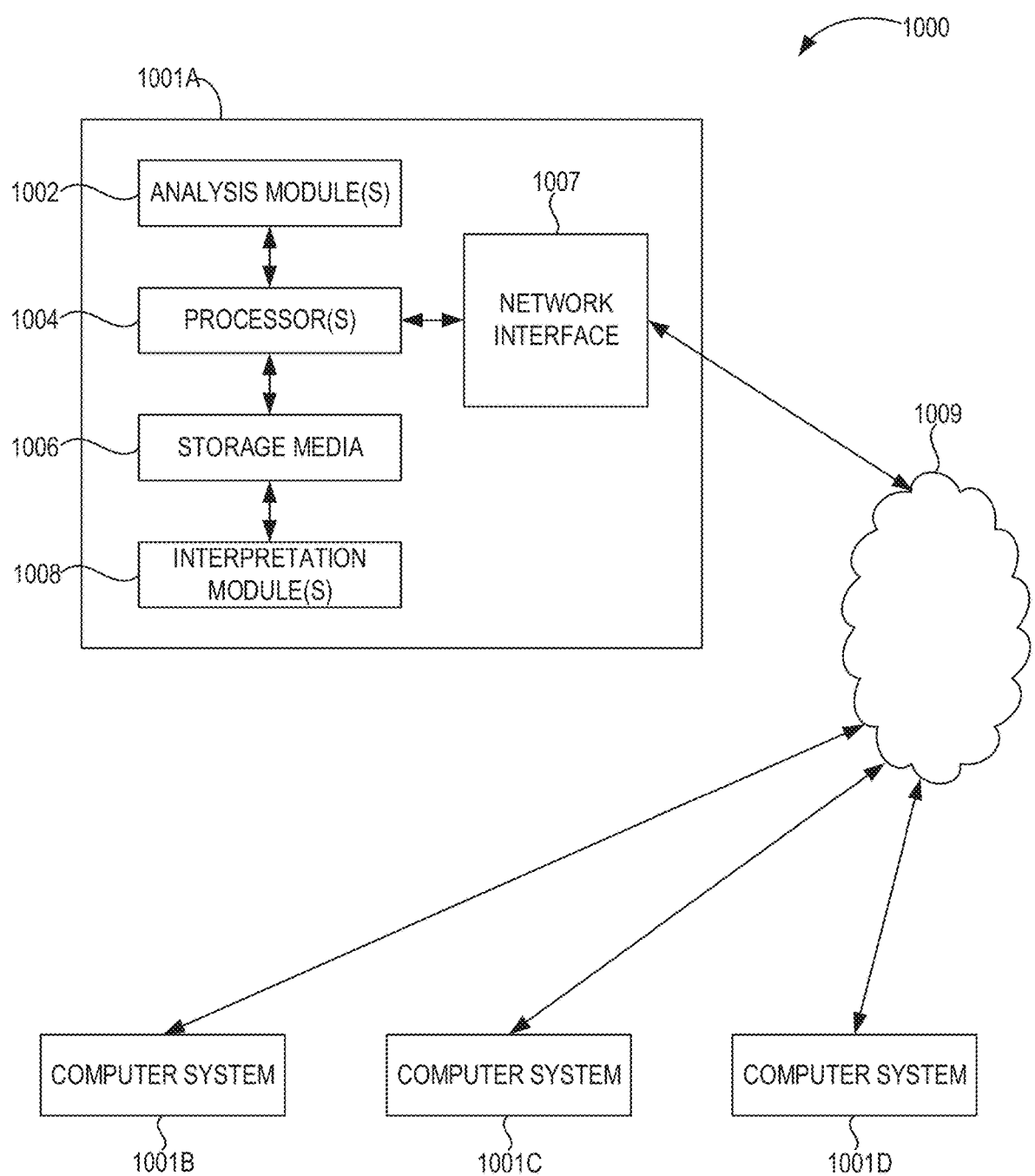
FIG. 10 illustrates a computing system, according to an embodiment.

In some embodiments, any of the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis module(s) 1002 configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more interpretation module(s) 1008. In the example of computing system 1000, computer system 1001A includes the interpretation module 1008. In some embodiments, a single interpretation module may be used to perform some or all aspects of one or more embodiments of the methods. In alternate embodiments, a plurality of interpretation modules may be used to perform some or all aspects of methods.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words "means for" together with an associated function.

What is claimed is:

1. A method for drilling, comprising:
    obtaining formation-measurement pairings for a subterranean formation;
    training a machine-learning model using the formation-measurement pairings, wherein training the machine-learning model comprises training the machine-learning model using computing resources that are located outside the well;
    receiving measurements obtained by a tool positioned in a well formed in the formation;
    generating a formation model of at least a portion of the formation using the machine-learning model and the measurements, wherein the formation model represents one or more physical parameters of the formation, one or more structural parameters of the formation, or both and wherein generating the formation model comprises generating the formation model using a processor positioned in the well without using computing resources located outside the well; and
    automatically adjusting a trajectory of the well based in part on the formation model, without intervention from a top surface of the well.

2. The method of claim 1, further comprising defining the formation in the formation model using one or more one-dimensional models.

3. The method of claim 1, further comprising defining the formation in the formation model using one or more pixel-based models in which formation depth intervals are identified as pixels that are assigned one or more formation property values.

4. The method of claim 1, further comprising pre-processing the measurements obtained by the tool by scaling the measurements, normalizing the measurements, or both.

5. The method of claim 1, wherein obtaining the formation-measurement pairings comprises receiving data collected while drilling offset wells.

6. The method of claim 1, wherein obtaining the formation-measurement pairings comprises:
    defining a well path through a second formation;
    simulating drilling through the second formation along the well path, wherein simulating comprises generating measurements while simulating the drilling; and
    determining one of the formation-measurement pairings based on the second formation and one or more of the measurements generated while simulating the drilling.

7. The method of claim 6, wherein:
    simulating drilling comprises changing one or more parameters of the second formation, the well path, or the tool, or changing a depth of the tool in the well path, or using a different well path; and
    obtaining the formation-measurement pairings comprises determining another one of the formation-measurement pairings after changing the one or more parameters, or changing the depth, or using the different well path.

8. The method of claim 1, wherein generating the formation model comprises using measurements collected in recorded mode measurement while drilling, and wherein the measurements collected in the recorded mode measurement are not transmitted from the tool, while the tool is in the well, to the top surface of the well.

9. The method of claim 1, wherein the machine-learning model comprises a regression model configured to generate an output within a continuous range.

10. The method of claim 1, wherein the formation model represents a portion of the formation that is proximal to and at least partially ahead of the tool on a well path.

11. A drilling tool, comprising:
    a sensor positioned in a well and configured to acquire measurements representing a formation;
    a processor positioned in the well and in communication with the sensor; and
    a memory system in communication with the sensor and the processor and positioned in the well, wherein the memory system comprises one or more non-transitory, computer-readable media storing thereon a database for the acquired measurements, a trained machine-learning algorithm trained using computing resources that are remote from the drilling tool, and instructions that, when executed, cause the drilling tool to perform operations, the operations comprising:
    receiving the measurements acquired by the sensor;

generating a formation model of at least a portion of the formation via processing the trained machine-learning algorithm and the measurements using the processor positioned in the well without using computing resources that are located outside the well; and
automatically adjusting a trajectory of the well based in part on the formation model without intervention from a top surface of the well.

12. The drilling tool of claim 11, wherein the operations further comprise storing at least some of the acquired measurements, wherein generating the formation model comprises using the measurements that are stored in the memory system, and wherein at least some of the measurements that are stored in the memory system are not transmitted to the top surface of the well.

13. The drilling tool of claim 11, wherein the trained machine-learning model comprises a regression model configured to generate an output within a continuous range.

14. The drilling tool of claim 11, wherein the formation model represents a portion of the formation that is proximal to and at least partially ahead of the drilling tool on a well path.

15. A method for drilling, comprising:
receiving a trained machine-learning model in a drilling tool, the machine learning model trained with a first processor positioned at a surface location using a training dataset comprising formation-measurement pairings, wherein the machine-learning model is configured to perform a non-linear, regression task and output a pixelized model of the formation based on the measurements in which formation depth intervals are identified as pixels that are assigned one or more formation property values;
obtaining subject measurements using the drilling tool positioned in a subject well formed in a subject formation; and
generating, using a second processor in the drilling tool positioned in the subject well without using computing resources that are located outside the subject well, a pixelated formation model of at least a portion of the subject formation using the trained machine-learning model and the subject measurements.

16. The method of claim 15, wherein at least some of the subject measurements acquired by the tool in the well are not transmitted to a top surface of the subject well, the method further comprising automatically adjusting a trajectory of the subject well based on the generated formation model without intervention from the top surface.

17. The method of claim 1, wherein said received measurements comprises resistivity measurements made by a logging while drilling resistivity tool deployed in the well.

18. The drilling tool of claim 11, wherein said generated formation model comprises a pixel-based model in which formation depth intervals are identified as pixels that are assigned one or more formation property values.

19. The drilling tool of claim 11, wherein the sensor is a logging while drilling resistivity sensor deployed in the well.

* * * * *